United States Patent
Laulicht et al.

(10) Patent No.: US 10,868,284 B2
(45) Date of Patent: *Dec. 15, 2020

(54) SAFELY INGESTIBLE BATTERIES AND METHODS

(71) Applicants: The Brigham and Women's Hospital, Inc., Boston, MA (US); Massachusetts Institute of Technology, Cambridge, MA (US)

(72) Inventors: Bryan Laulicht, Danbury, CT (US); Janet Freilich, Washington, DC (US); Jeffrey M. Karp, Brookline, MA (US); Robert Langer, Newton, MA (US)

(73) Assignees: The Brigham and Women's Hospital, Boston, MA (US); Massachusetts Institute of Technology, Cambridge, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/504,970

(22) Filed: Jul. 8, 2019

(65) Prior Publication Data

US 2020/0035961 A1    Jan. 30, 2020

Related U.S. Application Data

(63) Continuation of application No. 15/656,775, filed on Jul. 21, 2017, now Pat. No. 10,347,875, which is a
(Continued)

(51) Int. Cl.
*H01M 2/02* (2006.01)
*H01M 2/30* (2006.01)
(Continued)

(52) U.S. Cl.
CPC ......... *H01M 2/0222* (2013.01); *H01M 2/025* (2013.01); *H01M 2/0267* (2013.01);
(Continued)

(58) Field of Classification Search
None
See application file for complete search history.

(56) References Cited

U.S. PATENT DOCUMENTS 2,808,352 A    10/1957    Coleman et al.
3,223,555 A    12/1965    Solomon et al.
(Continued)

FOREIGN PATENT DOCUMENTS

EP    1233014 A1    8/2002
GB    2254807 A1    10/1992
(Continued)

OTHER PUBLICATIONS

QTC (Quantum Tunneling Composite). Data Sheet. Rev. A. Feb. 20, 2007. Rapid Electronics. [Retrieved on May 30, 2014]. http://www.rapidonline.com/pdf/06-1298e.pdf (5 pages).
(Continued)

*Primary Examiner* — Scott J. Chmielecki
(74) *Attorney, Agent, or Firm* — Eversheds Sutherland (US) LLP

(57) ABSTRACT

A battery for use in electronic devices and which is safely ingested into a body and a related method of making the battery. The battery includes an anode, a cathode and a quantum tunneling composite coating. The quantum tunneling composite coating covers at least a portion of at least one of the anode or the cathode and provides pressure sensitive conductive properties to the battery including a compressive stress threshold for conduction. The compressive stress threshold may be greater than a pre-determined applied stress in a digestive tract of the body in order to prevent harm if the battery is ingested. The battery may include a waterproof seal that extends between the quantum tunneling composite coating and a gasket separating the anode and
(Continued)

cathode to inhibit the battery from short circuiting in a conductive fluid below the compressive stress threshold.

20 Claims, 9 Drawing Sheets

Related U.S. Application Data continuation of application No. 14/774,984, filed as application No. PCT/US2014/020537 on Mar. 5, 2014, now Pat. No. 9,741,975.

(60) Provisional application No. 61/778,928, filed on Mar. 13, 2013.

(51) Int. Cl.
*H01M 10/42* (2006.01)
*H01M 2/08* (2006.01)
*H01M 2/34* (2006.01)
*H01M 2/18* (2006.01)

(52) U.S. Cl.
CPC ............... *H01M 2/08* (2013.01); *H01M 2/18* (2013.01); *H01M 2/30* (2013.01); *H01M 2/34* (2013.01); *H01M 10/4235* (2013.01); *H01M 2200/00* (2013.01); *H01M 2200/20* (2013.01); *H01M 2220/00* (2013.01); *H01M 2220/30* (2013.01)

(56) References Cited

U.S. PATENT DOCUMENTS

| | | | |
|---|---|---|---|
| 3,340,866 A * | 9/1967 | Noller | A61B 5/073 600/302 |
| 3,734,780 A | 5/1973 | Bilhorn et al. | |
| 6,291,568 B1 | 9/2001 | Lussey | |
| 6,828,060 B2 | 12/2004 | Zavilenski | |
| 8,540,633 B2 | 9/2013 | Hafezi et al. | |
| 8,721,540 B2 | 5/2014 | Hafezi et al. | |
| 8,765,027 B2 | 7/2014 | Lussey et al. | |
| 2007/0125181 A1 | 6/2007 | Ofek et al. | |
| 2008/0161786 A1* | 7/2008 | Belhe | A61B 18/1492 606/32 |
| 2009/0171343 A1* | 7/2009 | Paul | A61B 18/1492 606/34 |
| 2010/0185055 A1 | 7/2010 | Robertson et al. | |
| 2012/0058335 A1 | 3/2012 | Kamitani et al. | |
| 2012/0244409 A1 | 9/2012 | Ok | |
| 2012/0299550 A1 | 11/2012 | Ein-Eli et al. | |
| 2012/0321937 A1 | 12/2012 | Hutzler et al. | |
| 2013/0202922 A1 | 8/2013 | Dipietro et al. | |
| 2013/0224572 A1 | 8/2013 | Cassidy | |
| 2014/0030570 A1 | 1/2014 | Imanishi et al. | |

FOREIGN PATENT DOCUMENTS

| | | |
|---|---|---|
| JP | 59211955 A2 | 11/1983 |
| JP | 59051455 A2 | 3/1984 |
| WO | 2012/164429 A1 | 12/2012 |

OTHER PUBLICATIONS

International Search Report and Written Opinion for International Application No. PCT/US2014/020537, dated Jun. 23, 2014.
Patra, Prabir K. et al., "Quantum Tunneling Nanocomposite Textile Soft Structure Sensors and Actuators", National Textile Center Annual Report, Nov. 2005 (10 pages).
"Simple battery armor to protect against gastrointestinal injury from accidental ingestion", PNAS 2014 111 (46) pp. 16490-16495; published ahead of print Nov. 3, 2014, doi:10.1073/pnas.1418423111.

* cited by examiner

SAFELY INGESTIBLE BATTERIES AND METHODS

CROSS-REFERENCE TO RELATED APPLICATIONS

This application is a continuation of U.S. application Ser. No. 15/656,775 filed Jul. 21, 2017, which will issue as U.S. Pat. No. 10,347,875 on Jul. 9, 2019, and which is a continuation of U.S. application Ser. No. 14/774,984, filed Sep. 11, 2015, which issued as U.S. Pat. No. 9,741,975 on Aug. 22, 2017, and which is a U.S. national stage application of International Application Number PCT/US2014/020537, filed Mar. 5, 2014, which claims the benefit of the filing date of U.S. Provisional Application No. 61/778,928, filed Mar. 13, 2013, the entire contents of which are incorporated by reference herein for all purposes.

STATEMENT OF FEDERALLY SPONSORED RESEARCH OR DEVELOPMENT

This invention was made with United States Government support awarded by the following agencies: NIH Grant Nos. DE013023 and GM086433. The United States government has certain rights in this invention.

BACKGROUND

This disclosure relates to batteries. In particular, this disclosure relates to batteries with a coating that serves as a safety coating and provides pressure-sensitive conduction.

Billions of button batteries (also known as button cells) are sold each year to power portable electronic devices including, for example, small PDAs, musical greeting cards, glucometers, watches, virtual pet devices, hearing aids, and laser pointers. Tragically, accidental ingestion of these small batteries caused more than 40,400 children under the age of 13 to visit hospital emergency rooms, with 14 battery-related deaths in children 7 months to 3 years of age between 1997 and 2010 in the United States alone. As manufacturers create more powerful button batteries in smaller casings, button battery ingestion and injury is on the rise, and the increase in battery power yields a corresponding increase in severity of injuries and mortality resulting from button battery ingestion. Though safety standards now regulate locked battery compartments in toys, minimal technological development has taken place at the level of the battery to limit injury, particularly batteries in the greater than or equal to 20 millimeter format which are recognized as leading causes of complications if ingested. In addition to children, especially those under the age of five, an increasing number of seniors ingest button batteries after mistaking the button batteries for pills, particularly as button batteries are ubiquitous in devices used frequently by seniors, such as hearing aids. Furthermore, countless pets ingest button batteries each year.

Gastrointestinal (GI) obstruction is typically the first clinical symptom of button battery ingestion. However, button battery ingestion is more severe than ingestion of comparably sized objects, such as coins, due to damage by short circuit currents. Current flow in conductive GI fluids can cause electrolysis, generate hydroxide ions, and create long-term tissue damage in the digestive tract. Short circuiting of ingested button batteries has caused acute injuries including esophageal and GI perforations, trachea-esophageal fistulae, arterio-esophageal fistula leading to death, esophageal stenosis/stricture, chemical burns, as well as vocal cord paralysis. Case studies have shown that GI perforation in humans can occur as soon as five hours after battery ingestion. In pets, severe GI damage occurs even more quickly, with reports of transmural esophageal necrosis within one hour of ingestion in dogs and within two to four hours in cats.

Additionally, the short circuit current can damage the polymer gasket that separates the anode and cathode. Once the gasket is impaired or compromised, the contents of the button battery, including toxic metals such as cadmium, lead, mercury and lithium, may be released into the body. The release of button battery contents poses both the acute and long-term health risks associated with heavy metal ingestion.

SUMMARY OF THE DISCLOSURE

Given the various problems outlined above if batteries are ingested, a need exists for an improved battery. In particular, there is a need for a battery that, if ingested, can limit the external electrolytic currents responsible for damage to intestinal tissue as well as inhibit hazardous materials from entering the body.

The disclosed battery overcomes the aforementioned drawbacks by providing an ingestible battery with pressure-sensitive or pressure-gated conductive coating to prevent damage to intestinal tissue and to prevent the battery from releasing harmful contents into the body if ingested. In particular, a waterproof, pressure sensitive, quantum tunneling composite coating (QTCC) may serve as an electrically insulating barrier in the intestinal environment under the applied stress of a digestive tract while still being conductive in standard battery housings in which the stress applied to the battery in the housing exceeds the stress applied in the digestive tract.

According to one aspect, a battery is disclosed for use in electronic devices. The battery can be safely ingested into a body (e.g., a human body) that exerts a pre-determined applied stress in a digestive tract of the body. The battery includes an anode, a cathode, and a pressure-sensitive coating. The pressure-sensitive coating covers at least one of the anode and the cathode and provides pressure sensitive conductive properties including a compressive stress threshold. When a stress above the compressive stress threshold is applied to the pressure-sensitive coating, the pressure-sensitive coating is placed in an electrically conductive state. In order to avoid harm if the battery is ingested, the compressive stress threshold for conduction is greater than the pre-determined applied stress associated with (i.e., applied by) the digestive tract of the body.

The pressure-sensitive coating may be a quantum tunneling composite coating. When a stress above the compressive stress threshold is applied to the quantum tunneling composite coating, the quantum tunneling composite coating may be placed in a conductive state in which electrons are able to tunnel through the quantum tunneling composite coating. When no stress or a stress below the compressive stress threshold is applied to the quantum tunneling composite coating, the quantum tunneling composite coating may be said to be in an insulating state in which electrons are unable to quantum tunnel through the quantum tunneling composite coating.

The quantum tunneling composite coating may include a polymer matrix with conductive microparticles suspended therein. Collectively, the polymer matrix and the conductive microparticles provide the pressure sensitive conductive properties for the quantum tunneling composite coating. The polymer matrix is elastically deformable to alter the spacing of the suspended conductive microparticles relative to one another. In an unstressed state, the conductive microparticles are sufficiently spaced from one another, such that no conduction between the microparticles occurs, either via tunneling or direct conduction. However, under an applied stress that places the polymer matrix in a stressed state, the polymer matrix is at least temporarily elastically deformed in order to alter the spacing of the microparticles relative to one another. This decrease in spacing between the microparticles permits the tunneling of electrons through the polymer matrix in such a way as to make the quantum tunneling composite coating conductive—at least as long as the necessary stress is applied in excess of the threshold stress to permit tunneling. In one form, the polymer matrix may be a silicone rubber and the conductive microparticles may be silver. The conductive microparticles may include a surface with a nanoscale roughness that enhances an electric field gradient such that, when the conductive microparticles are less than 1-5 nm apart, electrons are able to tunnel through the polymer matrix, thereby conducting current therethrough. The polymer matrix of the quantum tunneling composite coating may provide a continuous and waterproof layer. The quantum tunneling composite coating may be disc-shaped and constructed from a quantum tunneling composite sheet.

The battery may further include a gasket that insulates and separates the anode and the cathode. The pressure-sensitive coating may be a water-impermeable coating that extends to the gasket and fully covers the at least one of the anode and the cathode to leave no exposed surfaces. However, in instances in which the pressure-sensitive coating does not fully cover the anode or the cathode (such that portions of the anode or the cathode would otherwise be exposed), a further waterproof seal may extend between the pressure-sensitive coating and the gasket. Accordingly, the pressure-sensitive coating with an optional additional waterproof seal may be used to inhibit the battery from short circuiting in a conductive fluid below the compressive stress threshold. The waterproof seal may be impermeable to water and comprise a poly-dimethyl siloxane material and a cross-linking agent. Moreover, it is contemplated that, in some forms, if a waterproof seal is present between the pressure-sensitive coating or quantum tunneling composite coating and a gasket, that the material of the polymer matrix of the pressure sensitive coating or quantum tunneling composite coating and the material of the waterproof seal may be the same material and/or these materials may be integral with one another.

The battery may be safely ingestible into the body because the pre-determined applied stress associated with the digestive tract of the body is below the compressive stress threshold of the pressure-sensitive coating. Because the stress or pressure required to initiate conduction is not applied by the digestive tract, if ingested, the battery will not conduct current and, thus, damage to intestinal tissues and release of harmful contents of the battery into the body is avoided. In some forms of the battery, in order to provide a safety margin, the compressive stress threshold required for conduction of the coating may be at least twice the pre-determined applied stress associated with the digestive tract of the body.

A conductive adhesive may be positioned between the pressure-sensitive coating and the anode and/or cathode on which the pressure-sensitive coating is received. In some forms, the conductive adhesive may comprise a conductive silver material.

To be sufficiently high as to exceed typical digestive tract applied stresses, the compressive stress threshold may have a value between 15.5 $N/cm^2$ and 19.4 $N/cm^2$.

The pressure-sensitive coating may be a pressure-gated coating, providing relatively discrete and sudden voltage response at a particular compressive stress.

The battery may be a button battery. However, it is contemplated that the concepts disclosed herein may be applicable to other styles and types of batteries and in particular those that might be ingested or subjected to electrically conductive liquid environments.

According to another aspect, another battery is disclosed for use in electronic devices in which the battery is designed to be safely ingested. The battery includes an anode, a cathode and a pressure-sensitive coating. The quantum tunneling composite coating covers at least one of the anode and the cathode and provides pressure sensitive conductive properties including a compressive stress threshold. The battery further includes a gasket, which separates a part of the anode and the cathode. The pressure-sensitive coating provides at least a portion of a water-impermeable coating that extends to the gasket and fully covers the at least one of the anode and the cathode to leave no exposed surfaces, thereby inhibiting the battery from short circuiting in a conductive fluid.

Again, the features described above may be included in this battery. For example, as described above, it is contemplated that the compressive stress threshold for conduction/quantum tunneling may be greater than an applied stress associated with the digestive tract of the body.

According to another aspect, the present invention discloses a method for constructing a battery having an anode and a cathode for use in electronic devices. The battery is safely ingestible into a body that exerts a pre-determined applied stress in its digestive tract. The method includes applying a pressure-sensitive coating on at least one of the anode and the cathode. The pressure-sensitive coating provides pressure sensitive conductive properties including a compressive stress threshold. Above the compressive stress threshold, the pressure-sensitive coating is placed in a conductive state in which electrons are able to conduct through the pressure-sensitive coating. Further, the compressive stress threshold is greater than the pre-determined applied stress associated with the digestive tract of the body.

In some forms, the method may further include the steps of separating at least a part of the anode and the cathode with a gasket and forming a waterproof seal between the pressure-sensitive coating and the gasket. A full and complete waterproof seal between the two can inhibit the anode and the cathode of the battery from short circuiting in a conductive fluid below the compressive stress threshold, such as may occur after ingestion of conventional batteries.

In some forms, the method may further include applying a conductive adhesive between at least one of the anode and the cathode prior to the step of applying the pressure-sensitive coating and adhesively attaching the pressure-sensitive coating to the anode and/or cathode via the conductive adhesive.

These and still other advantages of the invention will be apparent from the detailed description and drawings. What follows is merely a description of a preferred embodiment of the present invention. To assess the full scope of the invention, the claims should be looked to as the preferred embodiment is not intended to be the only embodiment within the scope of the claims.

DETAILED DESCRIPTION

Figure 1:
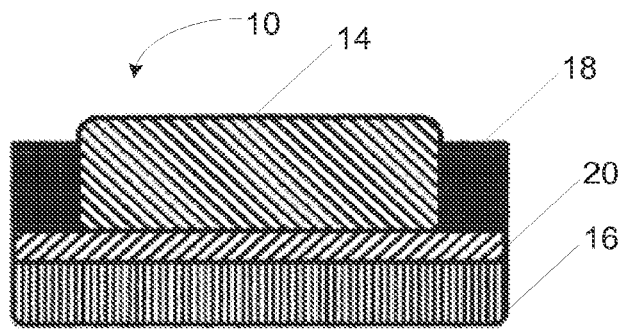
FIG. 1 is a side cross-sectional view of a conventional button battery.

Referring first to FIG. 1, a conventional button battery 10 is shown in cross section taken through the central axis of the battery. The conventional button battery 10 includes an anode 14 that is generally cylindrical in shape and a cathode 16 that is also generally cylindrical in shape. The anode 14 and the cathode 16 are separated by a separator 20. The separator 20 creates a barrier between the anode 14 and the cathode 16 that prevents them from touching, while still permitting electrical charge to flow freely between them via an electrolyte. A gasket 18 also separates a part of the anode 14 and a part of the cathode 16. The gasket 18 can be an electrically insulating ring, usually polymeric, that forms a seal on a part of the anode 14 and a part of the cathode 16. In the form illustrated, the gasket 18 forms a ring around the anode 14.

Figure 2:
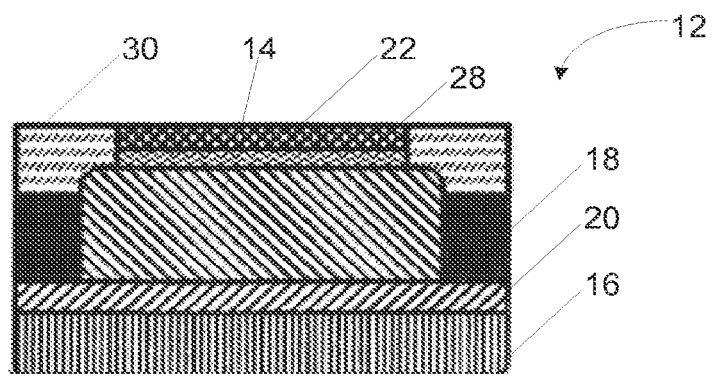
FIG. 2 is a side cross-sectional view of a button battery with a quantum tunneling composite coating (QTCC)
Figure 3:
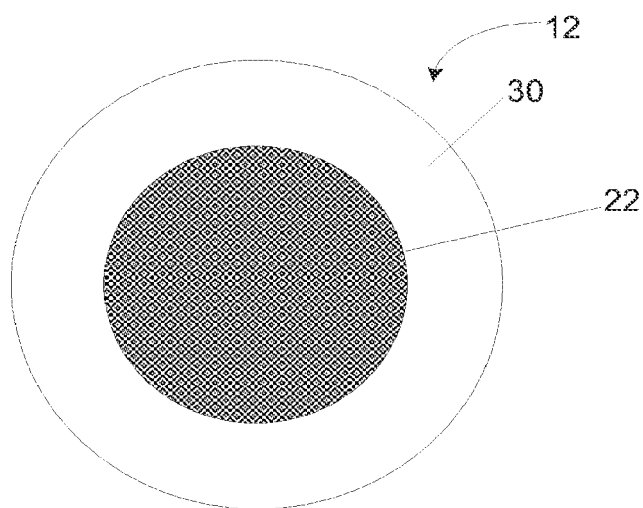
FIG. 3 is a top view of the QTCC button battery of FIG. 2.

Although not specifically illustrated in the schematics of the battery in FIGS. 1 through 3, which are somewhat simplified, it will be appreciated that in a commercial button battery there is typically also a cell top on the anode 14 and a cell can on the cathode 16 to provide an outer housing of the battery. The cell can typically extends up the cylindrical outer sides of the button battery 10 to the top of the gasket 18, while the cell top is received on the inner side of the ring-like gasket 18. The cell top and cell can are thin conductive housings that cover and contain the materials of the anode 14 and cathode 16. In order to prevent short circuiting, the cell can and the cell top are not in direct contact with one another, but rather are also separated from and electrically insulated from one another by the intermediate gasket 18.

It is contemplated that the cathode-anode materials of the battery 10 may be any of a number of electrochemical systems including, but not limited to, manganese dioxide-zinc, silver oxide-zinc, oxygen-zinc, manganese dioxide-lithium, carbon monofluoride-lithium, and copper oxide-lithium. Of course, other cathode or anode materials may be used and various electrolyte materials may be used in order to provide the desired electrical output when the button battery 10 is placed in an electrical device for use.

Turning now to FIGS. 2 and 3, an improved button battery 12 with a quantum tunneling composite coating (QTCC) 22 is illustrated that modifies the structure of the conventional battery 10 illustrated in FIG. 1. The QTCC button battery 12 addresses the potential risks following ingestion of the conventional button battery 10. The QTCC button battery 12 is a pressure sensitive, waterproof button battery design that adds a quantum tunneling composite coating 22 to the conventional button battery 10. As with the conventional battery 10, in the form illustrated, the QTCC button battery 12 includes an anode 14 that is generally cylindrical in shape and a cathode 16 that is generally cylindrical in shape. The anode 14 and the cathode 16 are again separated by a separator 20, and a gasket 18 separates a part of the anode 14 and a part of the cathode 16.

In addition to the conventional button battery structure, the improved button battery 12 includes a quantum tunneling composite coating 22 that covers at least a portion of at least one of the anode 14 and the cathode 16 in order to impart pressure sensitive conductive properties to the QTCC button battery 12. In the form illustrated, the quantum tunneling composite coating 22 covers a portion of the anode 14; however, in other designs, the quantum tunneling composite coating 22 may cover at least a portion of the cathode 16 or may cover at least a portion of both the anode 14 and the cathode 16. The quantum tunneling composite coating 22 may be disc-shaped, as shown in FIGS. 2 and 3, and constructed of quantum tunneling composite sheets, which will be described in detail below. Because the quantum tunneling composite coating 22 is selectively conductive above a threshold applied stress (as will be described in greater detail below), it should be disposed on an outer surface of the button battery 12 to which pressure may be applied when the battery is placed in use.

As illustrated, a conductive adhesive or paste 28 affixes the quantum tunneling composite coating 22 to the anode 14 (or the corresponding cell cap of the anode 14). If the quantum tunneling composite coating 22 covers the cathode 16, then the conductive adhesive 28 may also be positioned between the cathode 16 and the quantum tunneling composite coating 22. However, because the conductive adhesive 28 is not conductively pressure sensitive (and always is capable of conducting current), the conductive adhesive should not place the anode 14 and the cathode 16 in electrical communication with one another, thereby avoiding the creation of a direct short between the anode 14 and the cathode 16. The conductive adhesive 28 may comprise a conductive silver material to facilitate the transport of electrons from the anode 14 or cathode 16 to the quantum tunneling composite coating 22 received thereon.

Further, a waterproof seal 30 extends between the quantum tunneling composite coating 22 and the gasket 18, thereby separating a part of the anode 14 and the cathode 16 so that the QTCC button battery 12 will not short circuit in a conductive fluid (such as intestinal fluids) below a compressive stress threshold required for the quantum tunneling composite coating 22 to conduct. The waterproof seal 30 can be a water-impermeable silicone seal that is an electrically insulating, transparent silicone such as poly(dimethyl siloxane) (PDMS). Other possible coatings for the waterproof seal 30 could include, but are not limited to, siloxanes, butyl rubbers, or hard thermoplastic or thermoset polymers.

Figure 4:
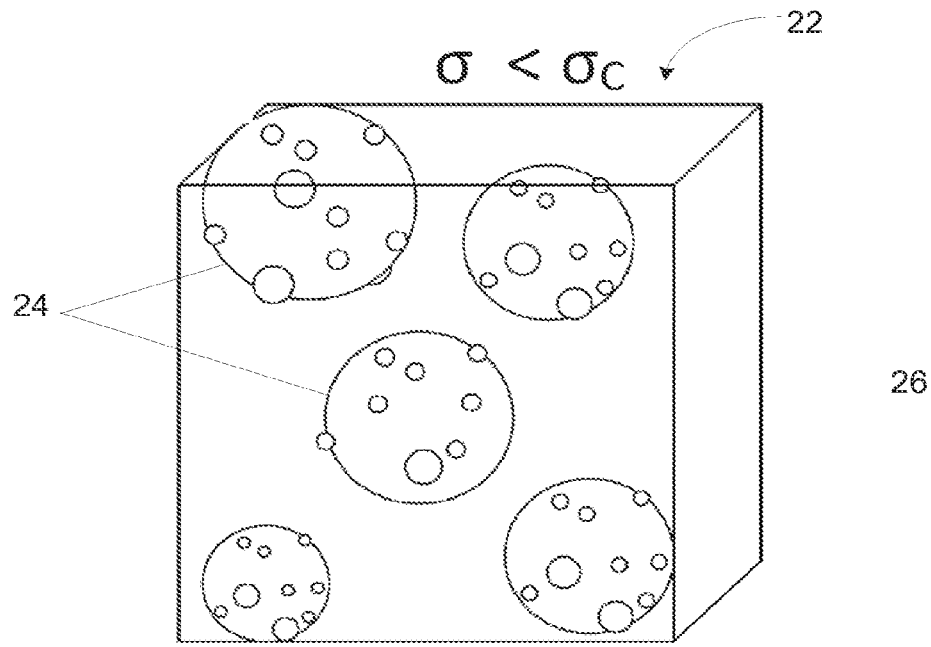
FIG. 4 is a schematic of a quantum tunneling composite coating in an insulating state in accordance with the present invention in which the compressive stress threshold for conduction has not been met.
Figure 5:
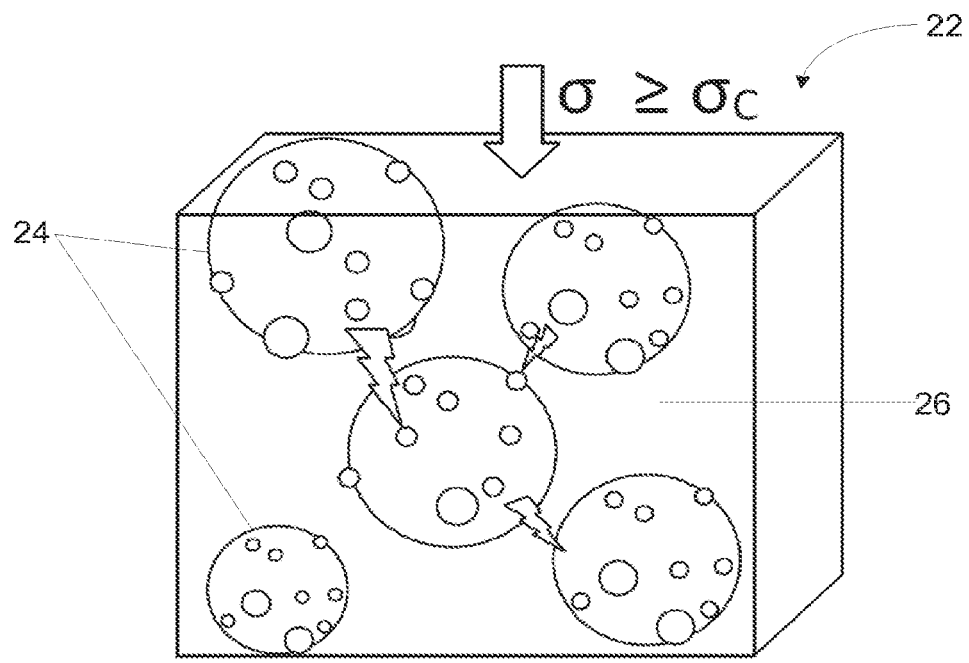
FIG. 5 is a perspective view of a quantum tunneling composite coating in a conductive state in which the compressive stress threshold for conduction has been met by the applied stress.

Turning now to FIGS. 4 and 5, the material of the quantum tunneling composite coating 22 is schematically shown in an insulating state and a conducting state, respectively. The quantum tunneling composite coating 22 comprises conductive microparticles 24 suspended in a polymer matrix 26 (generally depicted as filling the volume 26). In one form, the conductive microparticles 24 can be silver and the polymer matrix 26 can be an insulating PDMS. The depictions of FIGS. 4 and 5 are obviously grossly exaggerated for purposes of the schematic and it will be appreciated that far more microparticles will separate one side of the quantum tunneling composite coating 22 from the other side.

As depicted in FIG. 4, when an applied stress ($\sigma$) is zero or is less than the compressive stress threshold ($\sigma_c$) for conduction of the quantum tunneling composite coating 22, the conductive microparticles 24 are sufficiently spaced to prevent the quantum tunneling of electrons through the polymer matrix 26. Accordingly, when insufficient stress or pressure is applied to the quantum tunneling composite coating 22 (that is, the electrons are unable to tunnel through the quantum tunneling composite coating 22), the quantum tunneling composite coating 22 is unable to conduct current therethrough and is in an insulating state.

However, as depicted in FIG. 5, when an applied stress ($\sigma$) equals or exceeds the compressive stress threshold ($\sigma_c$) for conduction of the quantum tunneling composite coating 22, the conductive microparticles 24 are in sufficiently close proximity to enable the quantum tunneling of electrons through the polymer matrix 26. When electrons are able to tunnel through the coating 22, the quantum tunneling composite coating 22 is able to conduct current and may be said to be in a conducting state.

Accordingly, the quantum tunneling composite coating 22 can be selectively and reversibly transformed from an insulating state (FIG. 4) to a conductive state (FIG. 5), or vise-versa, by the application of stress or pressure which elastically deforms the polymer matrix 26 and alters the spacing of the microparticles 24 relative to one another. This mechanism allows the quantum tunneling composite coating 22 to be insulating below and conductive above the compressive stress threshold at which the QTCC button battery 12 achieves maximum voltage, while remaining impermeable to water.

In addition, it is contemplated that the pressure at which the QTCC button battery 12 conducts is directly proportional to the thickness of the quantum tunneling composite coating 22 for a given density of conductive microparticles 24. For example, when the conductive microparticles 24 have a higher average spacing at zero stress, greater axial compression is required to bring the conductive microparticles 24 into close enough proximity to achieve conduction. Since the quantum tunneling composite coating 22 may be affixed to the rigid housing of the QTCC button battery 12, compression is restricted to the axial direction. Therefore, the required pressure for conduction of the QTCC button battery 12 is not diameter dependent, and can be applied to any diameter button battery without significant design modification. Moreover, given that conduction is directly proportional to the thickness of the quantum tunneling composite coating 22 and the density of the conductive microparticles 24, significant tunability exists for triggering of conduction of the QTCC button battery 12.

The conductive microparticles 24 can have a nano-scale roughness present on the surface which further enhances the electric field gradient such that, when the conductive microparticles 24 come into close contact (for example, less than 1-5 nm), electrons can tunnel through the polymer matrix 26 that separates the conductive microparticles 24 in order to conduct current, shown in FIG. 5. Given that quantum tunneling does not require contact between the conductive microparticles 24, the polymer matrix 26 can remain continuous and therefore waterproof.

It is contemplated that other materials may also be used to make pressure-sensitive conduction coatings such as the quantum tunneling composite coating 22. For example, rather than silver, the microparticles might be made of gold particles, carbon particles, or other conductive microparticles. Likewise, the polymer matrix does not necessarily need to be PDMS. However, it will be appreciated that the selection of materials will contribute to the spacing required in order to create the selective pressure-sensitive conduction properties of the coating as well as establish the compressive threshold pressure required for conduction through the layer or coating.

Figure 6A:
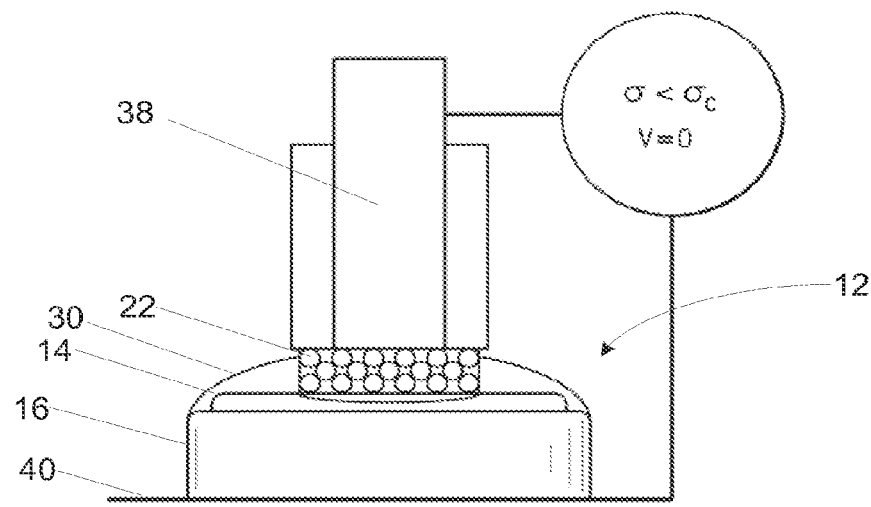
FIG. 6a is a side cross-sectional view of the QTCC button battery compressed below a compressive stress threshold of the QTCC.
Figure 6B:
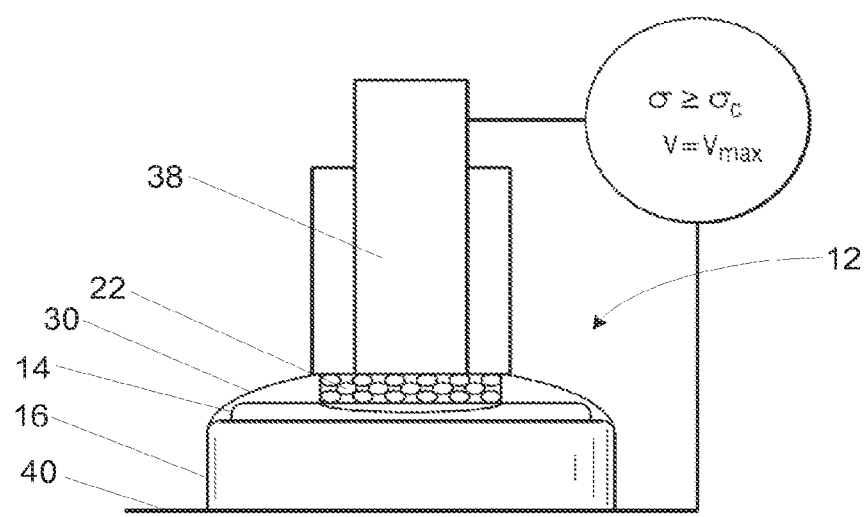
FIG. 6b is a side cross-sectional view of the QTCC button battery compressed above the compressive stress threshold of the QTCC.
Figure 6C:
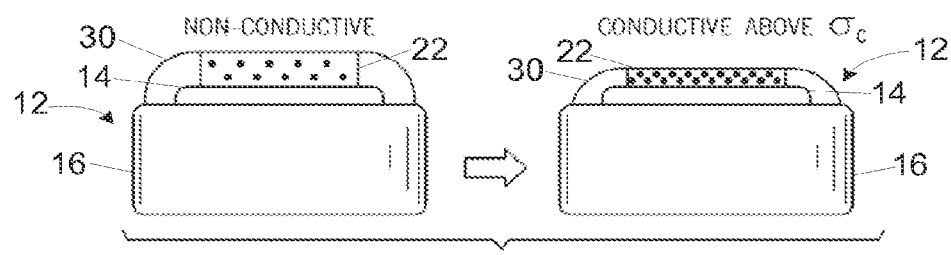
FIG. 6c is a side view comparing the QTCC button battery compressed below the compressive stress threshold of the QTCC to the QTCC button battery compressed above the compressive stress threshold of the QTCC.

Turning now to FIGS. 6a, 6b and 6c, the compressive stress threshold ($\sigma_c$) at which QTCC button batteries 12 achieve their maximum voltage (V=$V_{max}$) is shown. In order to determine the compressive stress threshold at which the QTCC button battery 12 achieves its maximum voltage, load and voltage are measured continuously between an insulated electrode 38 and a ground electrode 40 held in a water bath. Compressive stress and voltage are measured in real time. The QTCC button battery 12 is compressed below and above the compressive stress threshold ($\sigma_c$), and when the circuit is completed maximum voltage ($V_{max}$) is achieved. Below the compressive stress threshold ($\sigma_c$), the QTCC 22 component of QTCC button battery 12 remains in an insulated and non-conductive state as illustrated in FIG. 6a and the leftmost configuration of FIG. 6c. Above the compressive stress threshold ($\sigma_c$), the conductive microparticles 24 within the QTCC 22 are in a conductive state as illustrated in FIG. 6b and the rightmost configuration of FIG. 6c.

It will further be appreciated that the polymer matrix 26 and waterproof seal 30 may fully cover one of the surfaces of the anode 14 or cathode 16 to waterproof it so that the respective anode 14 or cathode 16 has no exposed surfaces. This is perhaps better illustrated in the schematic of FIG. 2 in which the waterproof seal 30 fully extends from the end of the quantum tunneling composite coating 22 to the gasket 18. Creating this waterproof seal eliminates short circuit current paths from the anode 14 to the cathode 16 if the battery 12 is submerged, while still enabling the pressure-sensitive QTCC button battery 22 to transmit its full potential difference ($V_{max}$) under sufficiently great stresses or pressures (even in the presence of a conductive fluid).

Figure 7A:
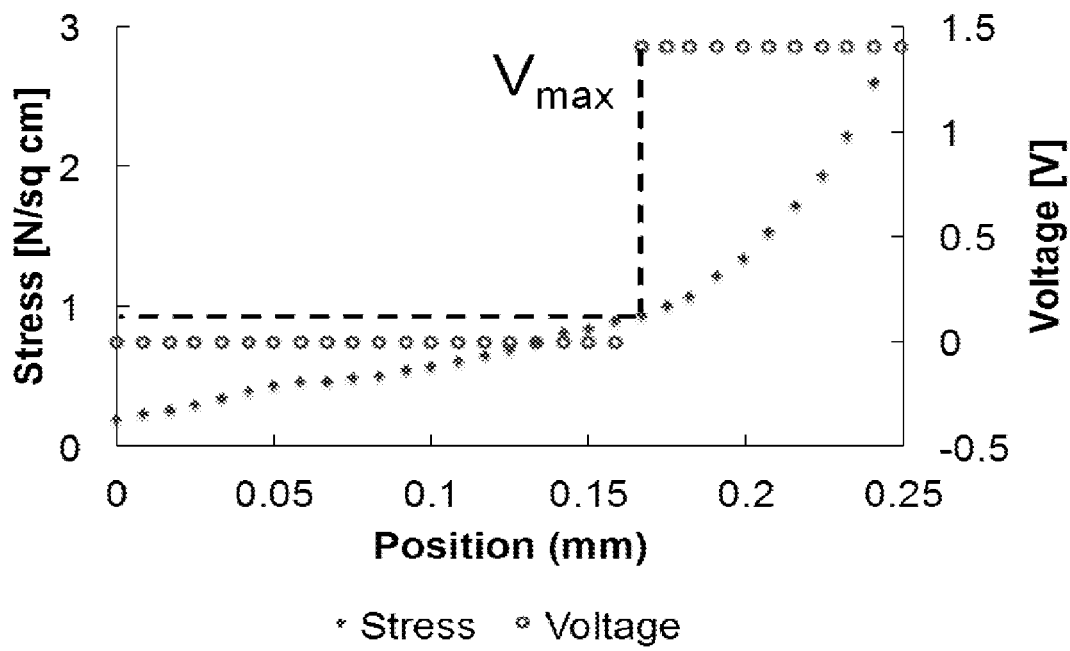
FIG. 7a is a graph of position plotted against stress and voltage of the conventional button battery that shows the compressive stress threshold at which the battery first achieves conduction in a dry environment.
Figure 7B:
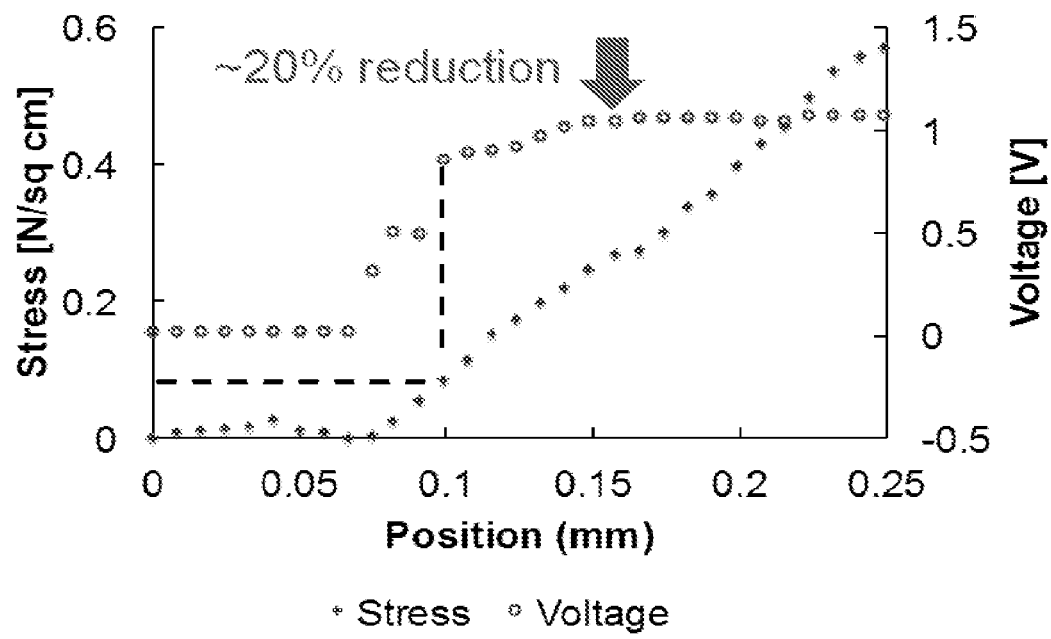
FIG. 7b is a graph of position plotted against stress and voltage of the conventional button battery that shows a reduction in conduction voltage due to a short-circuit current leaked via a conductive fluid (simulated intestinal fluid) connecting an anode and cathode as an alternate conduction pathway in the conductive fluid environment.
Figure 8A:
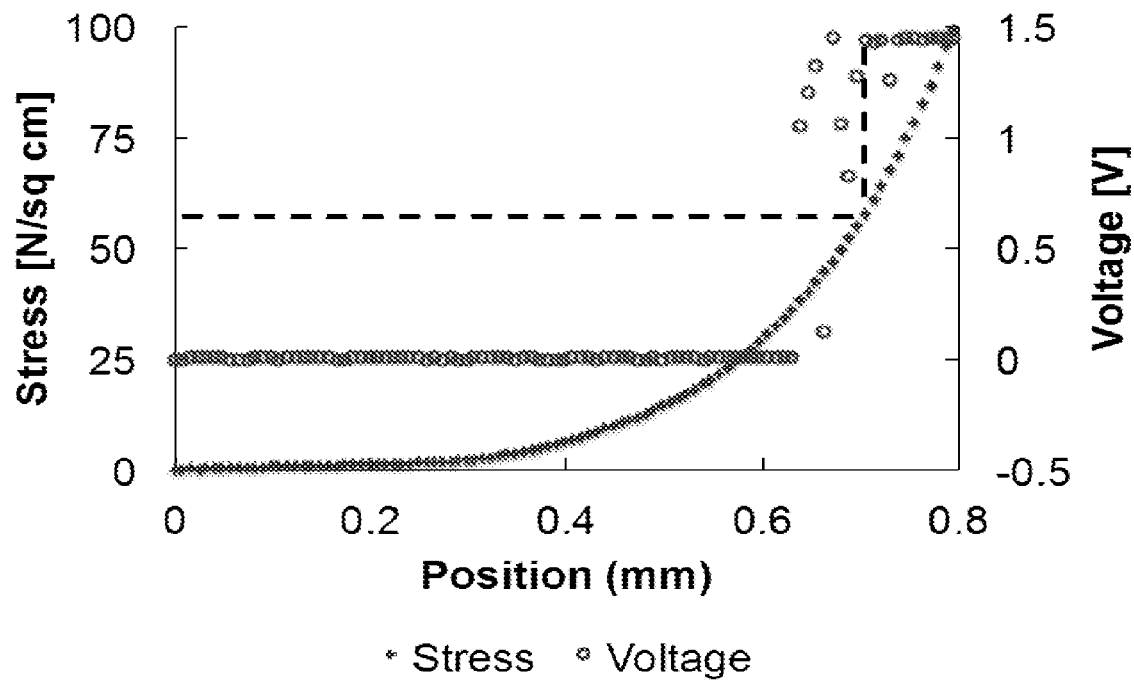
FIG. 8a is a graph of position plotted against stress and voltage of the QTCC button battery which shows a maximum voltage is reached and is equal to the maximum voltage of the conventional button battery of FIG. 7a in the dry environment.
Figure 8B:
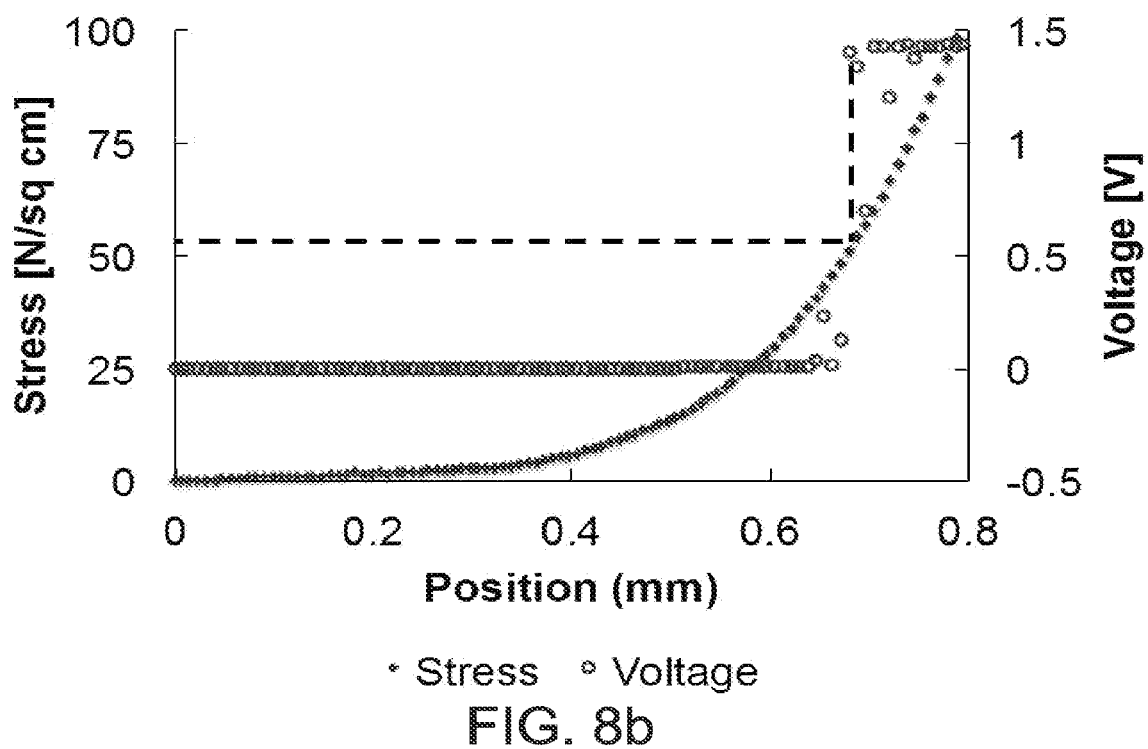
FIG. 8b is a graph of position plotted against stress and voltage of the QTCC button battery which shows that the QTCC button battery requires similar levels of the compressive stress threshold to achieve conduction compared to the conventional button battery of FIG. 7b in the simulated intestinal fluid environment.

Turning now to FIGS. 7a through 8b, simultaneous stress and voltage recordings from conventional button batteries 10 (FIGS. 7a and 7b) and QTCC button batteries 12 (FIGS. 8a and 8b) are shown. FIGS. 7a and 8a depict tests performed in dry environments, while FIGS. 7b and 8b depict tests performed with the batteries immersed in simulated intestinal fluid.

In FIG. 7a, in which a conventional battery is tested in a dry environment, under even a minimal applied stress (approximately 1 N/cm², highlighted by the dashed line), the conventional battery achieves conduction. This stress corresponds with the stress for forming sufficient contact with the anode and cathode and immediately yields conduction at the maximum voltage output $V_{max}$ of 1.5 V.

In FIG. 7b, the same conventional button battery is placed in simulated intestinal fluid. The conventional button battery shows an approximately 20 percent reduction in conduction voltage due to the short-circuit current leaked via the conductive fluid now electrically connecting the anode and the cathode as an alternative conduction pathway.

However, turning now to FIGS. 8a and 8b, the QTCC button batteries 12 require greater compressive stress in order to create conduction. Indeed, the compressive stress needed to initiate conduction is approximately 50 times that of conventional button batteries 10, which can be shown by comparing FIGS. 7a to 8a, in a dry environment. As shown in FIG. 8a, maximum voltage ($V_{max}$) is sustainably and consistently reached at approximately 58 N/cm² by a QTCC button battery 12 in the dry environment.

Even when the QTCC button battery 12 is tested in the simulated intestinal fluid, as shown in FIG. 8b, once the compressive stress threshold is met, the QTCC button battery 12 conducts with the same voltage as either the conventional button battery 10 in a dry environment or the QTCC button battery in the dry environment. Additionally, the maximum voltage ($V_{max}$) achieved is indistinguishably different from that in the dry environment, as shown in FIG. 8a, due to the waterproof design of QTCC button battery 12. This establishes that in the QTCC button battery 12 little or no current leak occurs. Thus if the button battery 12 is ingested, the generation of external electrolytic currents may be avoided.

The above demonstrates that incorporation of the QTCC 22 comprising the QTCC button battery 12 does not compromise the conductive state of button batteries. In addition, once coated with QTCC 22, the QTCC button battery 12 retains the capacity to power a device and through the differential pressure, triggering of current transmission can be modulated. Unlike conventional button batteries 10, QTCC button batteries 12 retain their voltage and output current when submerged in a conductive fluid, increasing their safety if ingested into the body and expanding their application range to include conductive fluid environments.

In order to design the QTCC button battery 12 that could be safely ingested into the body, a pre-determined applied stress from the body's digestive tract (i.e., a human gastrointestinal (GI) tract) needs to be identified. However, direct measurements of the GI crush strength are lacking. Therefore, extrapolated crush strength ($\sigma^*$) values from published studies on GI crush force of humans and canines was used.

Figure 9:
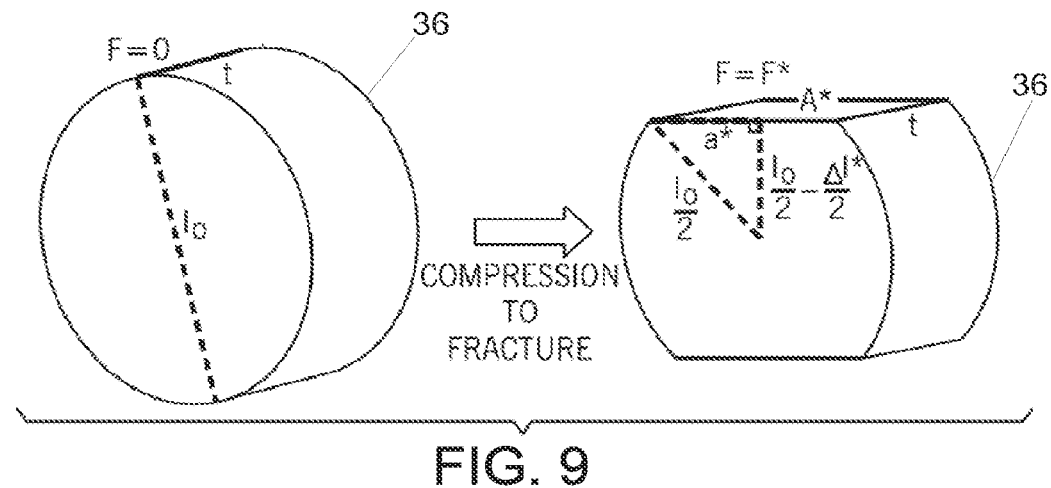
FIG. 9 is a side perspective view of an orally ingestible tablet used to determine the compressive stress threshold of the QTCC button battery.

Further to quantify GI crush force, manufactured orally ingestible tablets, shown in FIG. 9, composed of Teflon® microparticles compressed axially within cylindrical molds across the thickness of the tablets are used. As the applied compressive force (F) is increased, the microparticles are melded into closer proximity yielding stronger tablets. The applied compressive stress ($\sigma$.) was calculated by dividing the reported compressive force (F) and cross-sectional area (A) of the tablet. Induced strain (c) was calculated by dividing the reported change in tablet thickness ($\Delta t$) as compressive force was increased by the initial tablet 36 thickness ($t_o$). From the calculated values of stress and strain, the Young's modulus (E) of the tablet can be calculated by dividing stress by strain (E=$\sigma/\varepsilon$).

Determination of the pre-determined applied stress (that is, the GI crush strength) and comparison to QTCC button battery 12 compressive stress threshold ($\sigma_c$) at which maximum voltage is achieved was done using a tablet crush force test using the manufactured tablet 36, illustrated in FIG. 9.

The tablet crush force testing (F*) was performed in the longitudinal direction along the diameter of the tablets 36 as shown in FIG. 9. To calculate the rectangular area (A*) about which F* was acting during tablet 36 fracture, the tablet 36 was assumed to be homogenous. Therefore Young's modulus at the point of tablet fracture (E*) can be expressed as $$E^* \approx \frac{F^* l_0}{2t \sqrt{\frac{l_0 \Delta l^*}{2} \Delta l^*}},$$

where $\Delta l^*$ is the amount of compression the tablet underwent to failure, $l_o$ is the diameter of the tablet, t is the thickness of the tablet 36. Solving for $\Delta l^*$ yields $$\Delta l^* \approx \sqrt[3]{\frac{F^* l_0}{2t^2 E^*}}.$$

Having calculated Δl*, using the Pythagorean Theorem the half-width (a*) of the flattened rectangular portion of the tablet 36 circumference can be calculated:

$$a^{*2} = \left(\frac{l_0}{2}\right)^2 - \left(\frac{l_0}{2} - \frac{\Delta l^*}{2}\right)^2.$$

Given that Δl* is small relative to $l_o$, the $\Delta l^{*2}$ term can be considered negligible, therefore the equation simplifies to $$a^* \approx \sqrt{\frac{l_0 \Delta l^*}{2}}.$$

Thus A* can be calculated: A*=2a*t. Finally, the crush strength of the tablets can be calculated as σ*≈F*/A*.

In humans, tablets 36 with a crush strength (σ*) of approximately 15.5 N/cm² were crushed, while those with a crush strength of approximately 24.2 N/cm² remained intact. In canines, tablets 36 with a crush strength (σ*) of 19.4 N/cm² were crushed, while those with a crush strength of 23.4 N/cm² remained intact. Since the tablets 36 were similar in size and shape to button batteries, the calculated values serve as reliable estimates of the pre-determined applied stress (i.e., maximum crush strength) that the GI could impose on an ingested button battery. The pre-determined applied stress that is applied by the GI tracts of humans and dogs are less than the stresses required to create conduction in the QTCC button battery 12.

Figure 10:
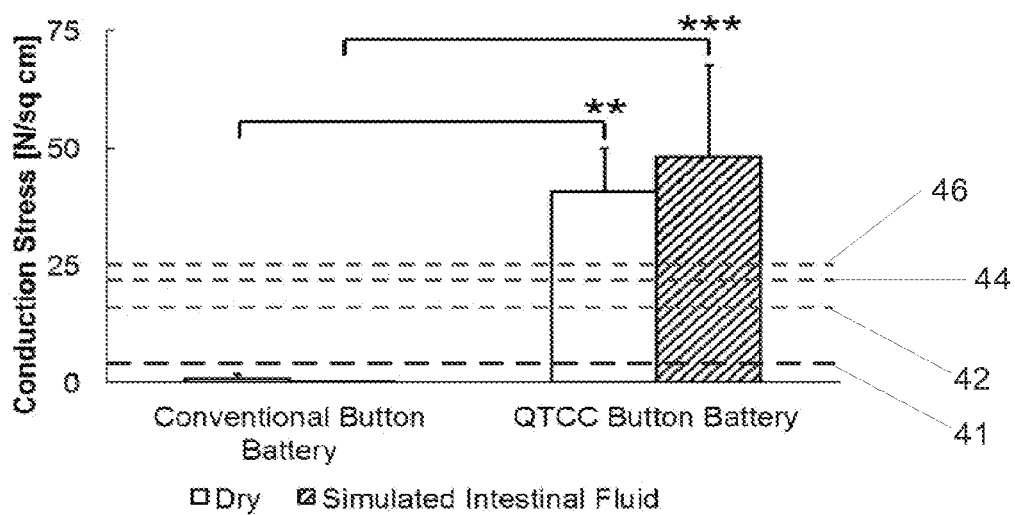
FIG. 10 is a bar graph showing the compressive stress thresholds required in order to induce current flow for a conventional button battery, a QTCC button battery in the dry environment, and a QTCC button battery in the conductive fluid environment.

Turning now to FIG. 10, the QTCC button batteries 12 are illustrated as requiring statistically significantly higher compressive stress thresholds to induce current flow than conventional button batteries 10 in dry environments and in the simulated intestinal fluid. Furthermore, FIG. 10 illustrates that the QTCC button batteries 12 require approximately an order of magnitude greater compressive stress than those measured in the esophagus to achieve conduction. Because conventional button batteries 10 conduct in simulated intestinal fluid while the pressure sensitive QTCC button batteries 12 require stress in excess of that experienced in the GI of adult humans even in rare spastic motility disorders, QTCC button batteries 12 may drastically lessen or even eliminate the button battery short circuiting following ingestion. Moreover, QTCC button batteries 12 can maintain their integrity even when exposed to simulated intestinal fluid, whereas conventional button batteries 10 conduct sufficient electrolytic current to degrade the conventional battery gaskets leading to battery content release.

FIG. 10 further illustrates yield strengths of tablets 36 of varying moduli for humans and dogs. The first dashed line 41 depicts the highest yield strength tablets 36 the human esophagus was able to crush. The second dashed line 42 depicts the highest yield strength tablets 36 the human gastrointestinal (GI) tract was able to crush. The third dashed line 44 depicts the highest yield strength tablets 36 the canine GI tract was able to crush. The fourth dashed line 46 represents the yield strength of tablets 36 that were sufficiently strong to survive digestion in humans and dogs while remaining intact. Notably, the average compressive stress threshold for QTCC button batteries 12 is approximately twice the yield strength of tablets 36 that remained intact throughout digestion by dogs or humans, which indicates that QTCC button batteries 12, unlike conventional button batteries 10, will not conduct a current (assuming they are also made to be waterproof to avoid short-circuit after ingestion).

Figure 12:
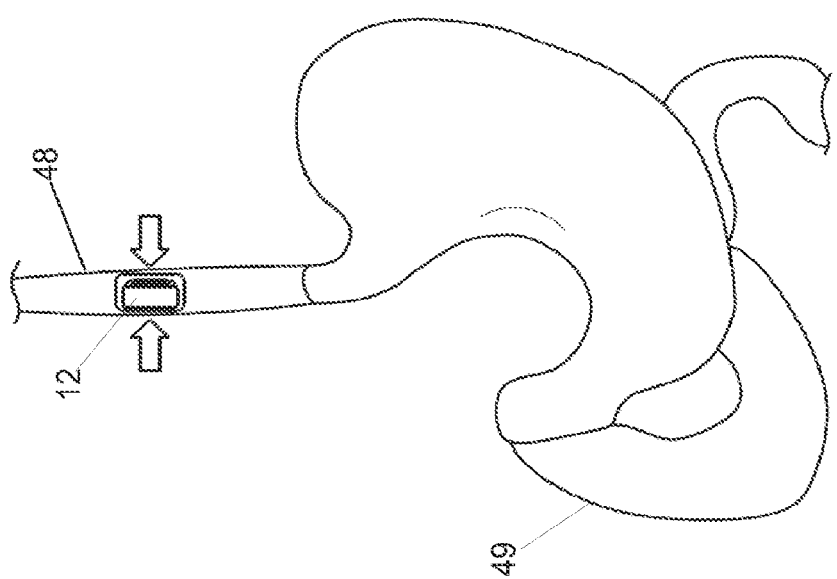
FIG. 12 is a schematic illustrating the QTCC button battery in the esophagus of the body that was safely ingested.
Figure 11:
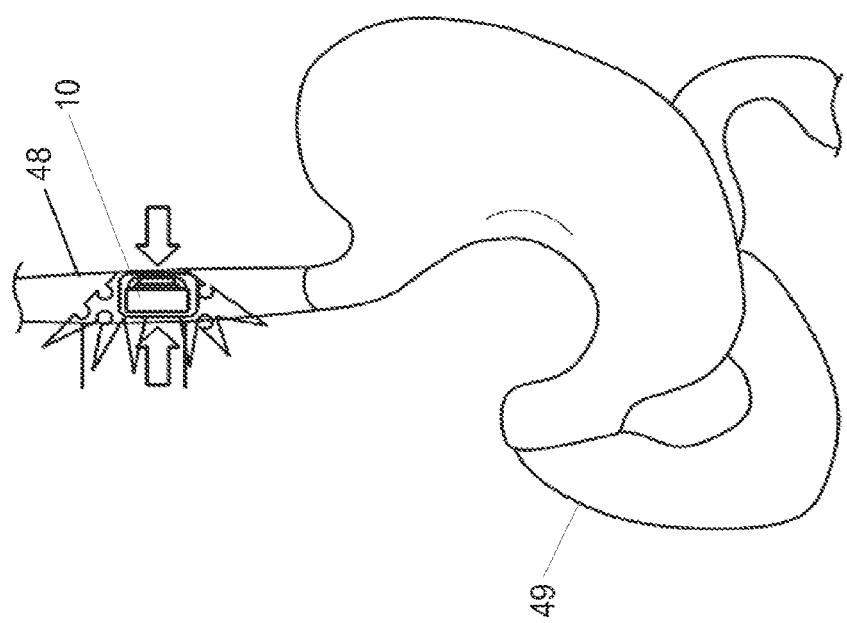
FIG. 11 is a schematic illustrating the conventional button battery in the esophagus of a body in which the battery is short circuiting and causing electrolysis to tissue of the esophagus.

Turning now to FIG. 11, a schematic of an ingested conventional button battery 10 injuring the esophagus 48 is shown. When conventional button batteries 10 contact or are pressed against GI mucosal tissues of the esophagus 48 or small intestine 49, for example, their short circuit current and electrolysis cause injury to the surrounding tissue. However, as shown in FIG. 12, the QTCC button batteries 12 (and for the reasons detailed above) do not short circuit either in contact with or as a result of pressure produced by GI motility, thereby increasing safety if ingested.

In addition to the acute health risks of short circuit current in the GI, the potential for absorption of the heavy metal contents of conventional button batteries 10 pose long-term health consequences. This is of particular importance in the pediatric community where the ingestion of button batteries occurs most frequently and may compromise neurological development. QTCC button batteries 12 remain intact in conductive fluid conditions after 48 hours showing no indication of short circuit current loss or expelling of toxic contents.

FIGS. 13a, 13b, 13c, and 13d further illustrate the QTCC button battery 12 remaining intact in conductive fluid conditions within the esophagus 48, while the conventional button battery 10 leaks during an in vivo esophageal battery retention model. Both the QTCC button battery 12 and the conventional button battery 10 were repeatedly evaluated endoscopically through the use of an esophageal overtube (not shown) to ensure the batteries remained stationary, thus approximating esophageal battery retention. The conventional button battery 10 and the QTCC button battery 12 were deployed in the esophagus 48 with the anode positioned on the posterior aspect of the esophagus 48 of the animal in the supine position.

Figure 13B:
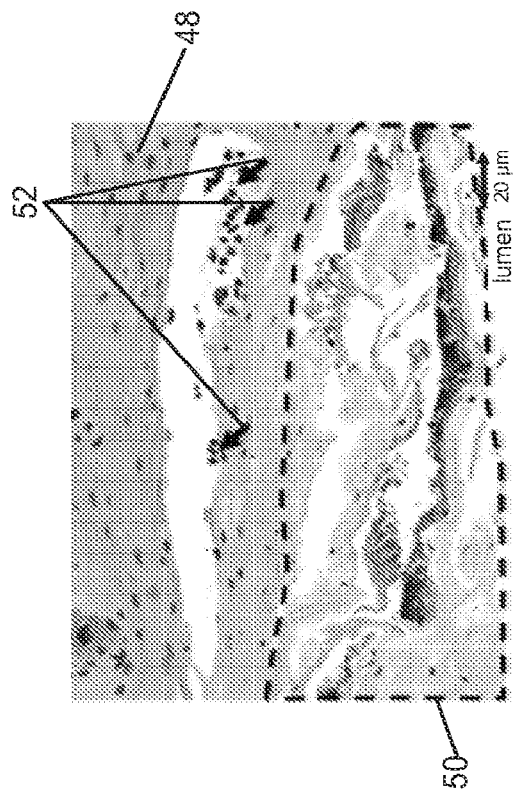
FIG. 13b is a microscopic image of FIG. 13a illustrating necrosis and neutrophilic infiltrate of the esophagus tissue caused by leakage of the conventional button battery's contents within the esophagus after ingestion of the conventional button battery.
Figure 13D:
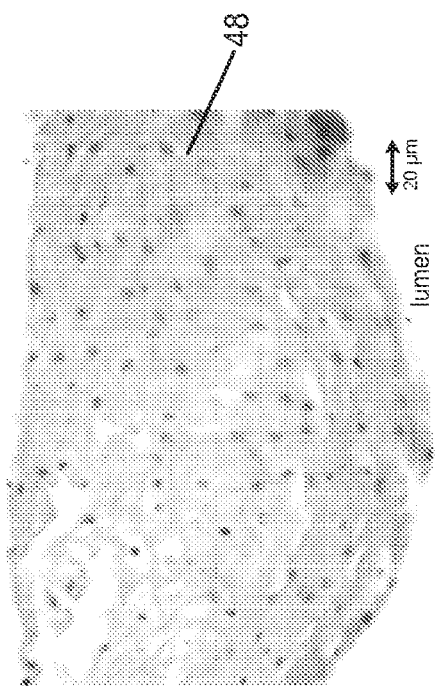
FIG. 13d is a microscopic image of FIG. 13c illustrating the lumen of the esophagus having no tissue damage after the QTCC button battery was safely ingested.
Figure 13A:
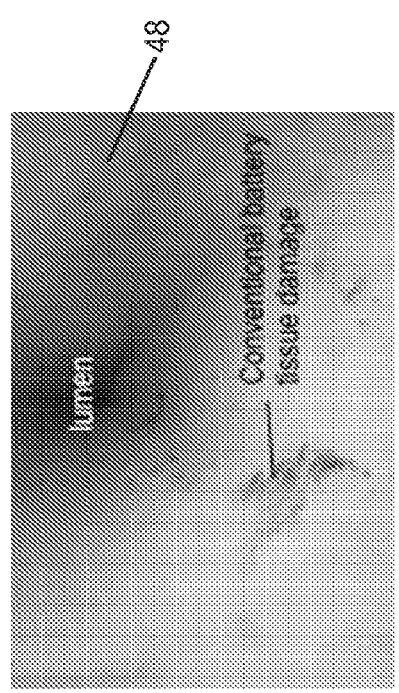
FIG. 13a is an image illustrating a lumen of the esophagus with tissue damage caused by leakage of the conventional button battery's contents within the conductive fluid conditions of the esophagus after ingestion of the conventional button battery.
Figure 13C:
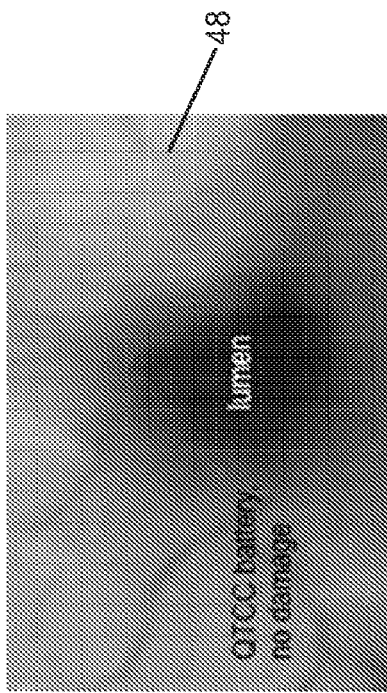
FIG. 13c is an image illustrating the lumen of the esophagus free of tissue damage within the conductive fluid conditions of the esophagus after ingestion of the QTCC button battery.

As shown in FIG. 13a, the conventional button battery 10 shows leakage of battery acid over the course of 2 hours during the endoscopic evaluation. Microscopically, as shown in FIG. 13b, esophageal tissue exposed to the conventional button battery 10 for 2 hours exhibited necrosis, as evidenced by desquamation and paucity of nuclei in the esophagus epithelium. The desquamation and paucity of nuclei is shown within the dashed line 50 in FIG. 13b. Additionally, the esophageal tissue exposed to the conventional button battery 10 exhibited neutrophilic infiltrate, as evidenced by the arrows 52 in FIG. 13b. In contrast, as shown in FIGS. 13c and 13d, the esophagus 48 continuously exposed to the QTCC button battery 12 appears normal both macroscopically and microscopically, thereby indicating no tissue damage.

Figure 14:
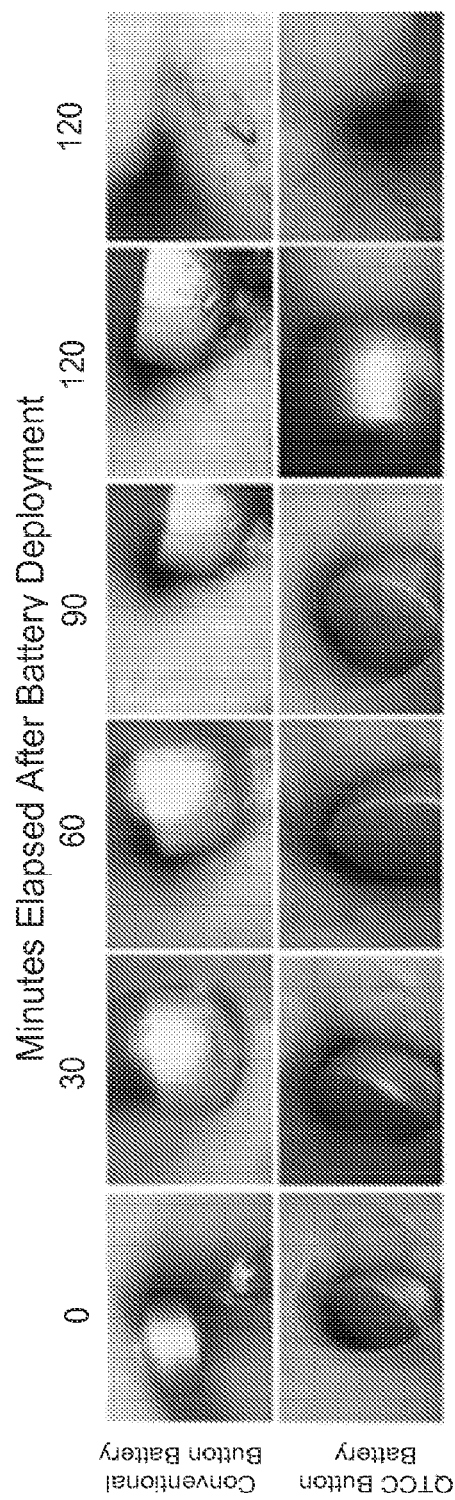
FIG. 14 is a series of endoscopic images acquired at 30 minute time intervals of the conventional button battery and the QTCC button battery in the esophagus in vivo.

Further, FIG. 14 shows endoscopic images acquired every 30 minutes of the conventional button battery 10 and the QTCC button battery 12 in the esophagus 48 in vivo. As shown in the top section of FIG. 14, the conventional button battery 10 demonstrates leaking of its contents starting at the 30 minute time point and continues to leak its contents up to the 120 minute time point. However, the QTCC button battery 12, as shown in the lower section of FIG. 14, appears to remain intact throughout the test period from 0 minutes to 120 minutes.

The above disclosed QTCC button battery 12 has several advantages. The materials used to construct QTCC button batteries 12 are inexpensive and readily scalable for mass production. Further, the QTCC button battery 12 is a waterproof, pressure sensitive, button battery that is insulating in the intestinal environment and conductive in standard battery housings. Importantly, the QTCC button battery 12 enables existing devices to be powered without modification, as these devices are typically capable of providing a compressive stress above the compressive stress threshold for conduction.

In addition, electromechanical characterization demonstrates that QTCC button batteries 12 can require approximately twice the pre-determined applied stress supplied by the adult gastrointestinal tract to conduct, providing a sufficient margin of safety given the potential variability of digestive tracts. While conventional button batteries 10 that are immersed in the conductive fluid environment readily damage intestinal tissue and rapidly release harmful contents including cadmium, lead, mercury and lithium that may be absorbed, immersion of QTCC button batteries 12 under the same conditions remain waterproof and do not produce electrolysis or tissue damage following immersion.

The present invention has been described in terms of one or more preferred embodiments, and it should be appreciated that many equivalents, alternatives, variations, and modifications, aside from those expressly stated, are possible and within the scope of the invention.

The invention claimed is:

1. A battery, comprising:
    an anode;
    a cathode; and
    a pressure-sensitive coating that comprises a quantum tunneling composite covering at least one of the anode and the cathode and providing pressure sensitive conductive properties including a compressive stress threshold such that, when a stress above the compressive stress threshold is applied to the quantum tunneling composite coating, the quantum tunneling composite coating is placed in a conductive state in which electrons are able to tunnel through the quantum tunneling composite coating,
    wherein the compressive stress threshold is greater than a pre-determined applied stress associated with a digestive tract of a body.

2. The battery of claim 1, wherein the battery is a button battery.

3. The battery of claim 1, wherein, when no stress or a stress below the compressive stress threshold is applied to the quantum tunneling composite coating, the quantum tunneling composite coating is in an insulating state in which electrons are unable to quantum tunnel through the quantum tunneling composite coating.

4. The battery of claim 1, wherein the quantum tunneling composite coating comprises a polymer matrix with conductive microparticles suspended therein that collectively provide the pressure sensitive conductive properties for the quantum tunneling composite coating.

5. The battery of claim 1, further comprising a gasket that insulates and separates the anode and the cathode.

6. The battery of claim 1, wherein the compressive stress threshold has a value between 15.5 N/cm$^2$ and 19.4 N/cm$^2$.

7. The battery of claim 1, wherein the pressure-sensitive coating is a pressure-gated coating.

8. A battery, comprising:
    an anode;
    a cathode; and
    a pressure-sensitive coating that comprises a quantum tunneling composite covering at least one of the anode and the cathode and providing pressure sensitive conductive properties including a compressive stress threshold such that, when a stress above the compressive stress threshold is applied to the quantum tunneling composite coating, the quantum tunneling composite coating is placed in a conductive state in which electrons are able to tunnel through the quantum tunneling composite coating,
    wherein the compressive stress threshold is between 15.5 N/cm$^2$ and 19.4 N/cm$^2$.

9. The battery of claim 8, wherein the battery is a button battery.

10. The battery of claim 8, wherein, when no stress or a stress below the compressive stress threshold is applied to the quantum tunneling composite coating, the quantum tunneling composite coating is in an insulating state in which electrons are unable to quantum tunnel through the quantum tunneling composite coating.

11. The battery of claim 8, wherein the quantum tunneling composite coating comprises a polymer matrix with conductive microparticles suspended therein that collectively provide the pressure sensitive conductive properties for the quantum tunneling composite coating.

12. The battery of claim 8, further comprising a gasket that insulates and separates the anode and the cathode.

13. The battery of claim 8, wherein the pressure-sensitive coating is a pressure-gated coating.

14. A battery, comprising:
    an anode;
    a cathode;
    a pressure-sensitive coating that comprises a quantum-tunneling composite coating covering at least one of the anode and the cathode and providing pressure sensitive conductive properties including a compressive stress threshold, the compressive stress threshold being greater than a pre-determined applied stress associated with a digestive tract of a body; and
    a gasket separating a part of the anode and the cathode,
    wherein the pressure-sensitive coating provides at least a portion of a water-impermeable coating extending to the gasket and fully covering the at least one of the anode and the cathode to leave no exposed surfaces thereby inhibiting the battery from short circuiting in a conductive fluid.

15. The battery of claim 14, wherein, when a stress above the compressive stress threshold is applied to the quantum tunneling composite coating, the quantum tunneling composite coating is in a conductive state in which electrons are able to quantum tunnel through the quantum tunneling composite coating and, wherein, when no stress or a stress below the compressive stress threshold is applied to the quantum tunneling composite coating, the quantum tunneling composite coating is in an insulating state in which electrons are unable to quantum tunnel through the quantum tunneling composite coating.

16. The battery of claim 15, wherein the quantum tunneling composite coating comprises a polymer matrix with conductive microparticles suspended therein that collectively provide the pressure sensitive conductive properties for the quantum tunneling composite coating.

17. The battery of claim 16, wherein the polymer matrix comprises a silicone rubber and the conductive microparticles comprise silver.

18. The battery of claim 14, wherein the compressive stress threshold has a value between 15.5 N/cm$^2$ and 19.4 N/cm$^2$.

19. The battery of claim 14, wherein the pressure-sensitive coating is a pressure-gated coating.

20. The battery of claim 14, wherein the battery is a button battery.

\* \* \* \* \*